United States Patent
Iihara et al.

(10) Patent No.: US 6,224,490 B1
(45) Date of Patent: May 1, 2001

(54) CONSTANT VELOCITY JOINT AND METHOD OF MAKING AN OUTER RACE THEREFOR

(75) Inventors: Michio Iihara; Yasushi Takahara; Masami Yamaguchi, all of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/253,031

(22) Filed: Feb. 19, 1999

(30) Foreign Application Priority Data

Feb. 27, 1998 (JP) .................................................. 10-046462

(51) Int. Cl.[7] ...................................................... F16D 3/16
(52) U.S. Cl. .......................... 464/145; 464/143; 464/141; 464/139
(58) Field of Search ..................................... 464/139, 141, 464/906, 143, 145, 7, 15

(56) References Cited

U.S. PATENT DOCUMENTS

| 4,406,146 | 9/1983 | Suzuki . | |
|---|---|---|---|
| 4,843,864 | 7/1989 | Welschof . | |
| 5,542,885 | * 8/1996 | Krude et al. | 464/145 |
| 5,616,081 | * 4/1997 | Krude et al. | 464/145 |
| 5,788,578 | * 8/1998 | Shimizu et al. | 464/145 |
| 5,947,826 | * 9/1999 | Seguin | 464/145 |

FOREIGN PATENT DOCUMENTS 196 05 641
A1  9/1996 (DE) .

* cited by examiner

Primary Examiner—Lynne H. Browne
Assistant Examiner—Aaron Dunwoody
(74) Attorney, Agent, or Firm—Sughrue, Mion, Zinn, Macpeak & Seas, PLLC (57) ABSTRACT

A constant velocity joint includes an outer race (1) having a spherical inner surface (2) with track grooves (3) each extending in an axial direction thereof, an inner race having a spherical outer surface (5) formed with track grooves (6) equal in number to the number of the track grooves (3) in the outer race (1), a plurality of torque transmitting balls (7) sandwiched between the inner race (4) and the outer race (1) and accommodated in part in the track grooves (6) in the inner race (4) and in part in the track grooves (3) in the outer race (1), and a cage (8) for retaining the torque transmitting balls (7) while being guided by and between the spherical inner surface (2) of the outer race (1) and the spherical outer surface (5) of the inner race (4). This constant velocity joint of the structure described above is featured in that at least the track grooves (3) in the outer race (1) and an entry chamfer (11) of the outer race (1) are formed by a plastic working process. A method of making the outer race (1) in the constant velocity joint is also provided.

3 Claims, 10 Drawing Sheets

CONSTANT VELOCITY JOINT AND METHOD OF MAKING AN OUTER RACE THEREFOR

BACKGROUND OF THE INVENTION

1. Field of the Invention

The present invention relates to a constant velocity joint which may be mainly used in association with an automobile shaft, and also to a method of making an outer race used in the constant velocity joint.

2. Description of the Prior Art

A constant velocity joint has been well known in the art which comprises an outer race having a spherical inner surface formed with track grooves, an inner race having a spherical outer surface formed with track grooves, a plurality of torque transmitting balls sandwiched accommodated in between the inner race and the outer race, and a cage for retaining the torque transmitting balls. The outer race has an open edge formed with an entry chamfer to provide an outwardly flaring surface so that at the time of inclination of one of the inner and outer races relative to the other, a shaft mounted with the inner race will not collide against the open edge of the outer edge.

In making the outer race for this type of the constant velocity joint, the use of the working process in which a milling or grinding technique is used, tends to take a relatively long time to make, renders it to be difficult to achieve an increase in preciseness and tends to reduce the yield.

For this reason, it has hitherto been suggested in which (1) an entry chamfer of the outer race is worked on by the use of a plastic working process and the track grooves are formed by a milling process, and (2) the track grooves and the spherical inner surfaces are worked on by the use of the plastic working process and the entry chamfer is finished by the use of a mechanical process.

However, in the case where the track grooves are formed by the use of the milling process as described under item (1) above, difficulty has been encountered in that the precision of the track grooves cannot easily be increased and, accordingly, a grinding process is necessary to be performed after the milling process, resulting in increase of the number of manufacturing steps and, also, reduction in yield.

Also, in the case where the entry chamfer is finished by the use of the mechanical process as described under item (2) above, difficulty has similarly been encountered in that precision of the entry chamfer cannot easily be increased, accompanied by increase of the number of manufacturing steps and, also, reduction in yield. Since the entry chamfer is an element operable to regulate the maximum angle of inclination of the constant velocity joint, the entry chamfer is required to have a high precision.

SUMMARY OF THE INVENTION

Accordingly, the present invention has been devised with a view to substantially eliminating the above discussed problems and is intended to provide a method of making the constant velocity joint and the outer race used therein, which are effective to increase the precision of the track grooves and the entry chamfer, to reduce the number of the manufacturing steps, to increase the yield and to reduce the manufacturing cost.

Another important object of the present invention is to increase the precision of the spherical inner surface of the outer race, to further reduce the number of the manufacturing steps and to increase the yield.

To accomplish these objects, the present invention provides a constant velocity joint which comprises an outer race having a spherical inner surface formed with track grooves each extending in an axial direction thereof, an inner race having a spherical outer surface formed with track grooves equal in number to the number of the track grooves in the outer race, a plurality of torque transmitting balls sandwiched between the inner race and the outer race and accommodated in part in the track grooves in the inner race and in part in the track grooves in the outer race, and a cage for retaining the torque transmitting balls while being guided by and between the spherical inner surface of the outer race and the spherical outer surface of the inner race. This constant velocity joint of the structure described above is featured in that at least the track grooves in the outer race and an entry chamfer of the outer race are formed by a plastic working process.

According to the present invention, since the track grooves and the entry chamfer of the outer race are finished by the use of the plastic working process, the precision of the track grooves and the entry chamfer can advantageously be increased. Also, formation of the track grooves and the entry chamfer in the outer race requires no post-working process such as a grinding process and, therefore, not only can the number of manufacturing steps be reduced, but the yield can be increased. In addition, the precision of the track grooves and the entry chamfer can also be increased.

In the constant velocity joint of the present invention, the spherical inner surface of the outer race may also be formed by the plastic working process. In this case, not only can the precision of the spherical inner surface be increased, but the number of the manufacturing steps can also be further reduced, accompanied by increase of the yield.

Preferably, each of the track grooves formed on the outer race may have each of opposite sides defined in a deep region thereof, which is formed with an escapement which is recessed radially outwardly from the spherical inner surface. The presence of the escapements in the track grooves is effective to retain a grease with which the track grooves, serving as ball rolling surfaces for the torque transmitting balls, can be lubricated positively and effectively.

The present invention also provides a method of making the outer race for the constant velocity joint of the type referred to above. This outer race making method of the present invention comprises preparing a drawing die and a combination punch which comprises a plurality of split punches arranged in a circular row each punch having a track groove shaping portion defined therein and a ring-shaped chamfer forming die having a chamfer forming portion disposed adjacently in a direction axially of the circular row of the split punches, inserting the combination punch inside a cup-shaped outer race material flaring outwardly towards an open end thereof; drawing an outer diameter of the outer race material by means of a drawing die while track forming portions of the split punches are inserted in track grooves formed in an inner peripheral surface of the outer race material, to thereby press inner surfaces of the track grooves of the outer race material against the track forming portions, and pressing the chamfer forming die against an end face of a peripheral entry edge of the outer race material incident to insertion of the combination punch. The plastic working of the outer race material may be carried out by means of a cold process, a hot process or a heated process.

According to the present invention, using the split punches each having the track groove forming portion, and the combination punch provided with the ring-shaped chamfer forming die, and by forming with this combination punch and the drawing die, the track grooves and the entry chamfer can advantageously be formed in the outer race material all at a time by the plastic working process during a single process step.

In the practice of the outer race making method of the present invention, each of the split punches may have a spherical surface forming portion with the track groove forming portion protruding outwardly from the spherical surface forming portion and, in such case, during a process in which the outer diameter of the outer race material is drawn inwardly by the drawing die and the inner surface of the track grooves of the outer race material is pressed against the track groove forming portions, the inner surface of the outer race material may be pressed against the spherical surface forming portion of each of the split punches.

Thus, using the split punches each having the spherical surface forming portion and the track groove forming portion, in combination with the combination punch provided with the ring-shaped chamfer forming die, the spherical surface, the track grooves and the entry chamfer can advantageously be formed in the outer race material all at a time by the plastic working process during the single process step.

Preferably, each of the split punches has a bulged portion formed in each of opposite sides of the track groove forming portion in a deep region thereof, said bulged portion having a diameter greater than the diameter of the spherical surface forming portion, but smaller than the diameter of the corresponding track groove forming portion. In this way, the escapements can be formed by the plastic working process.

Also, the outer race material may have an axially extending escapement groove defined in a portion thereof which is pressed against the spherical surface forming portion of each of the split punches, so that the possibility can be avoided in which raised portions may be formed on the spherical inner surface of the outer race thus formed.

BRIEF DESCRIPTION OF THE DRAWINGS

In any event, the present invention will become more clearly understood from the following description of preferred embodiments thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

The preferred embodiment of the present invention will now be described with reference to FIGS. 1 to 17.

Figure 1:
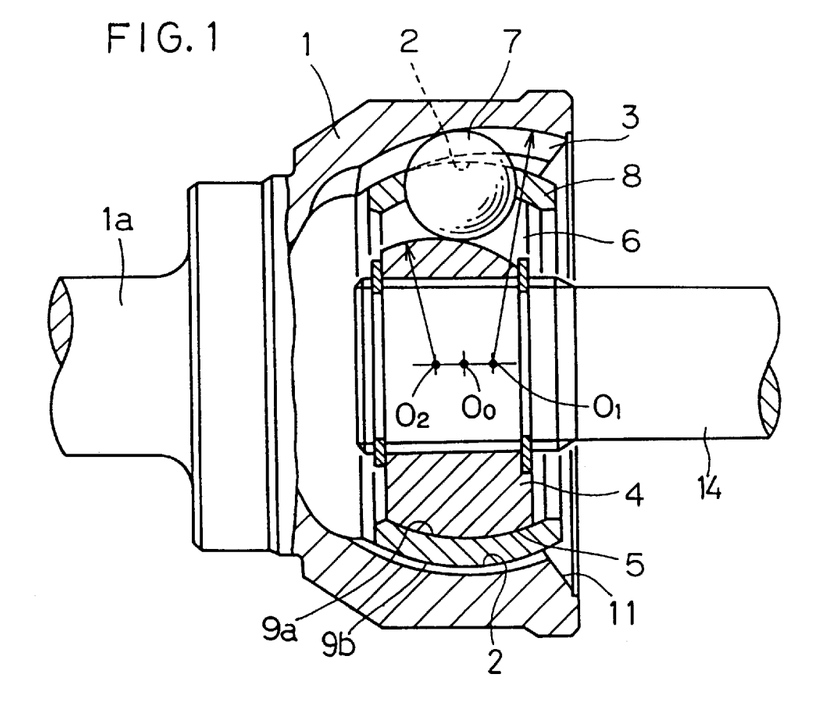
FIG. 1 is a sectional view of a constant velocity joint according to a preferred embodiment of the present invention.

FIG. 1 illustrates a constant velocity joint. This constant velocity joint includes an outer race 1 having a spherical inner surface 2 formed with a plurality of track grooves 3 so as to extend in a direction parallel to an axial direction thereof, an inner race 4 having a spherical outer surface 5 formed with track grooves 6 equal in number to the number of the track grooves 3 in the outer race 1 and extending in an axial direction of the inner race 4; and torque transmitting balls 7 rollingly retained by a cage 8, that is positioned between the outer and inner races 1 and 4, and received in part within the associated track grooves 2 in the outer race 1 and in part within the associated track grooves 6 in the inner race 4. The cage 8 intervening between the outer and inner races 1 and 4 has spherical inner and outer surfaces 9a and 9b opposite to each other and is positioned with the spherical inner and outer surfaces 9a and 9b thereof adapted to be guided in sliding contact with the spherical outer surface 5 of the inner race 4 and the spherical inner surface 2 of the outer race 1. The outer race 1 has an entry chamfer 11 defined along an open edge thereof. The outer race 1 is integrally connected with a shaft 1 a whereas the inner race 4 is mounted on an outer periphery of a shaft 14.

The track grooves 3 in the outer race 1 have a cross-sectional shape, as viewed along a center line of a bottom line of each of the track grooves 3, which represents a substantially arcuate curve. The center of sphere $O_1$ of each of the track grooves 3 of the outer race 1 and the center of curvature $O_2$ of each of the track grooves 6 of the inner race 4 are offset leftwards and rightwards with respect to the center $O_0$ of the angle of the joint. It is to be noted that the center $O_0$ of the angle of the joint coincides with the center of the spherical shape of the spherical inner surface 2 of the outer race 1 and the center of the spherical shape of the spherical outer surface 5 of the inner race 4.

Figure 2A:
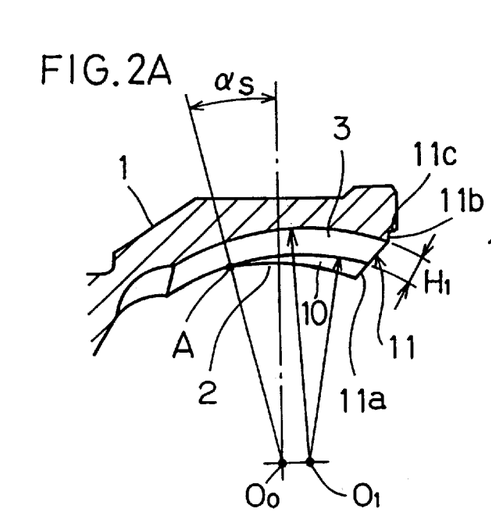
FIG. 2A is a sectional view showing track grooves and an entry chamfer of an outer race shown in FIG. 1.
Figure 2B:
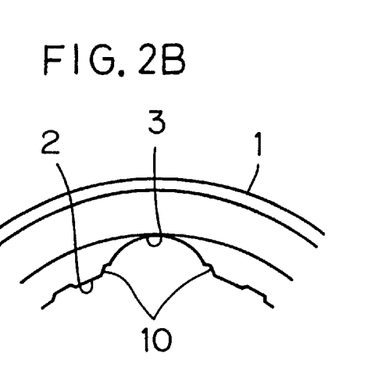
FIG. 2B is a side view of the track grooves and the entry chamfer both shown in FIG. 2A.

FIGS. 2A and 2B illustrate a portion of the outer race 1 shown on an enlarged scale. The outer race 1 has the entry chamfer 11 defined so as to extend circumferentially along the open edge thereof. The entry chamfer 11 is so formed as to extend from the spherical inner surface 2 of the outer race to a radial position corresponding to the groove bottom of each of the track grooves 3 and represents a substantially conical surface inclined a predetermined angle β (See FIG. 4) relative to the axial direction. This predetermined angle β is so chosen to be, for example, about 60°. More specifically, this entry chamfer 11 includes a chamfer inner diametric portion 11a which is a main chamfer portion and which is inclined the predetermined angle β, a flat portion 11b extending radially outwardly from the chamfer inner diametric portion 11a and perpendicular to the axial direction, and a conical chamfer outer diametric portion 11c which is continued from the flat portion 11b towards an end face of the outer race 1. When viewed from the outer race 1 in the axial direction, the entry chamfer 11 represents such a shape as shown by cross-hatched areas in FIG. 6A or FIG. 6B.

As shown in FIG. 2B, opposite sides of each of the track grooves 3 in the outer race 1 are formed with respective escapements 10, and as shown in FIG. 2A, each of the track grooves 3 has an effective depth $H_1$ which is uniform all over the range from a position A, displaced deep towards the outer race 1 an angle as relative to a linear line containing the center $O_0$ of sphere of the spherical inner surface 2 which perpendicularly intersects the longitudinal axis of the outer race 1, to an open end (or a right end as viewed in FIG. 2A) of the outer race 1.

Figure 3:
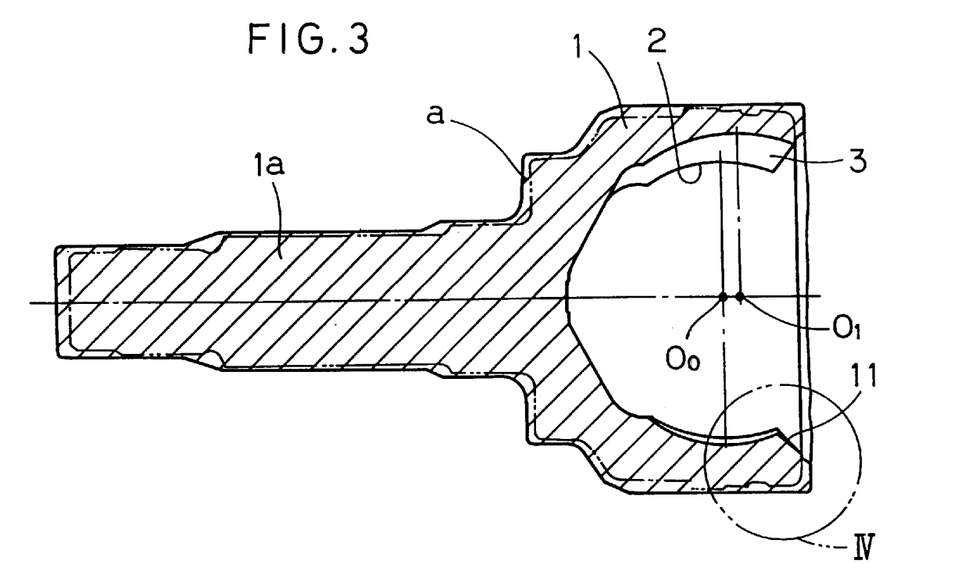
FIG. 3 is a sectional view showing an outer race material having been completely formed by the use of a plastic working process.
Figure 5:
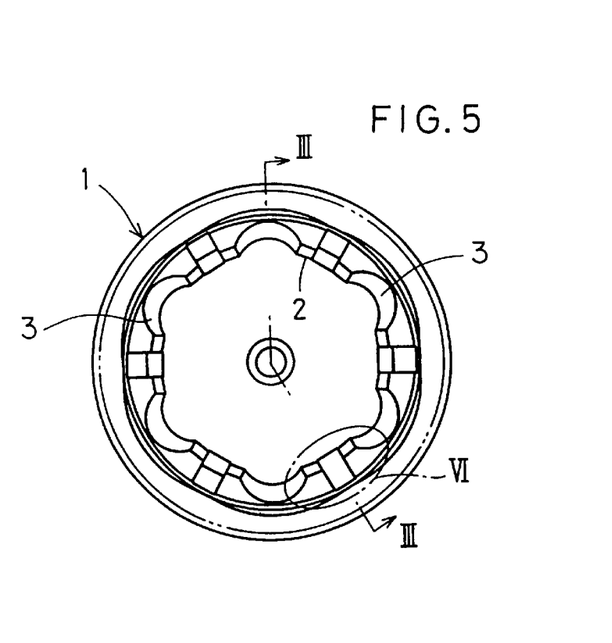
FIG. 5 is a front elevational view of the outer race material having been completely formed by the use of the plastic working process.

The spherical inner surface 2 of the outer race 1, the track grooves 3 in the outer race 1 and the entry chamfer 11 are all finished by means of a plastic working process. In other words, the spherical inner surface 2, an inner surface of each of the track grooves 3 and a surface of the entry chamfer 11 are all plastic working finished surfaces. The outer race 1 is such as shown in FIG. 3 when those surfaces have been finished by the plastic working process and, thereafter, the outer diametric surface is machined to a shape shown by the double-dotted chain lines a in FIG. 3 to complete the outer race 1. FIG. 3 represents a cross-sectional view taken along the line III—III in FIG. 5.

Figure 13:
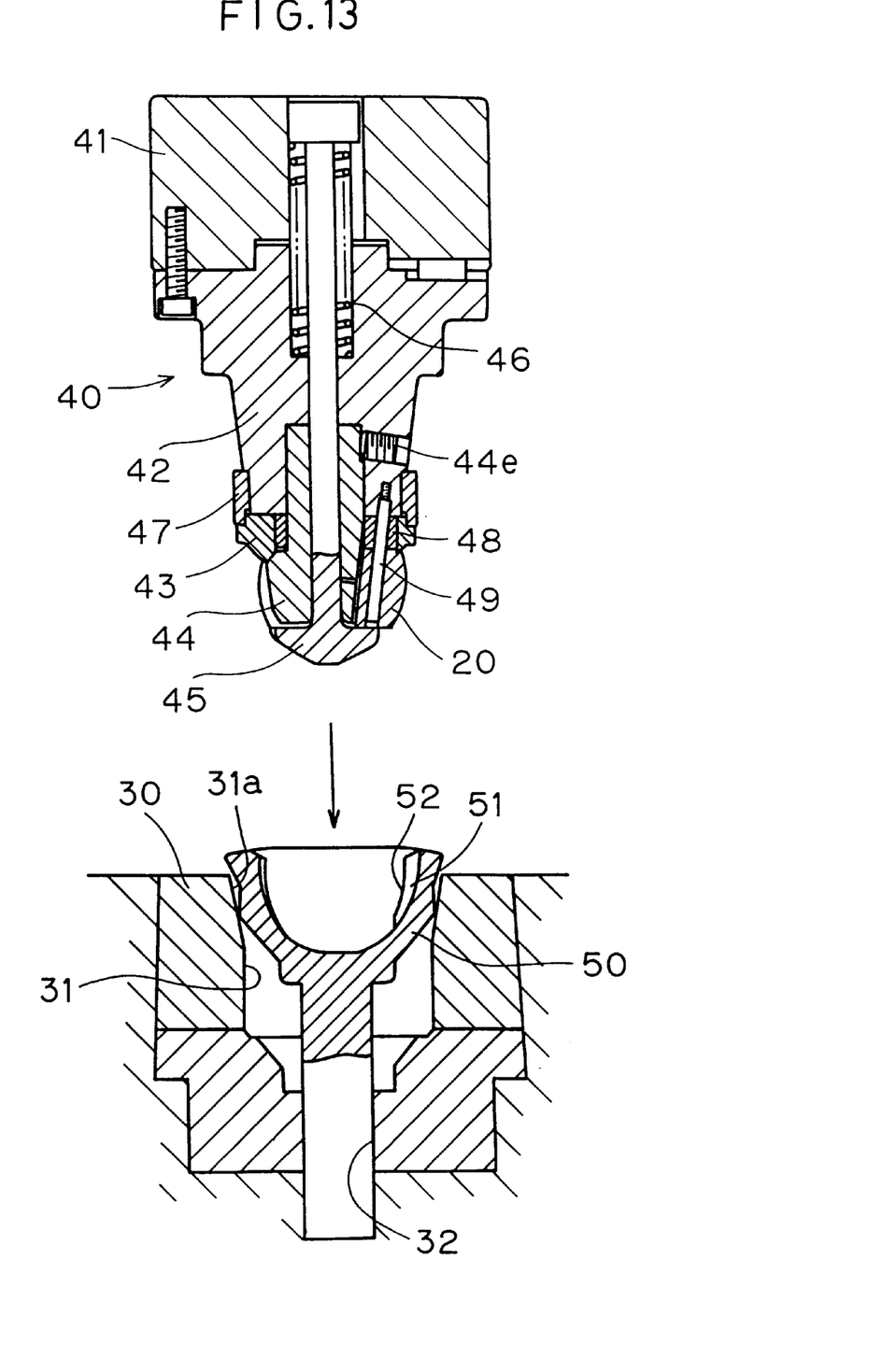
FIG. 13 is a longitudinal sectional view of an outer race forming die comprised of the combination punch and a drawing die.

FIG. 13 illustrates a combination punch 40 and a drawing punch 30, which are respective parts of an outer race forming die assembly. As shown on an enlarged scale in FIG. 8, the combination punch 40 comprises a holder 42 fixedly bolted to an undersurface of a press slide 41, a chamfer forming die 43 disposed at an undersurface of the holder 42, a taper base 44 having a shank 44a received in a round recess at a center portion of the undersurface of the holder 42, a plurality of split punches 20 disposed so as to surround the taper base 44, and a front punch 45 having a shaft 45a inserted in a center hole of the taper base 44 and then in a center hole of the holder 42. The taper base 44 is fixed to the holder 42 by means of a plurality of set screws 44e threadingly engaged in corresponding screw holes defined in the holder 42.

Figure 8:
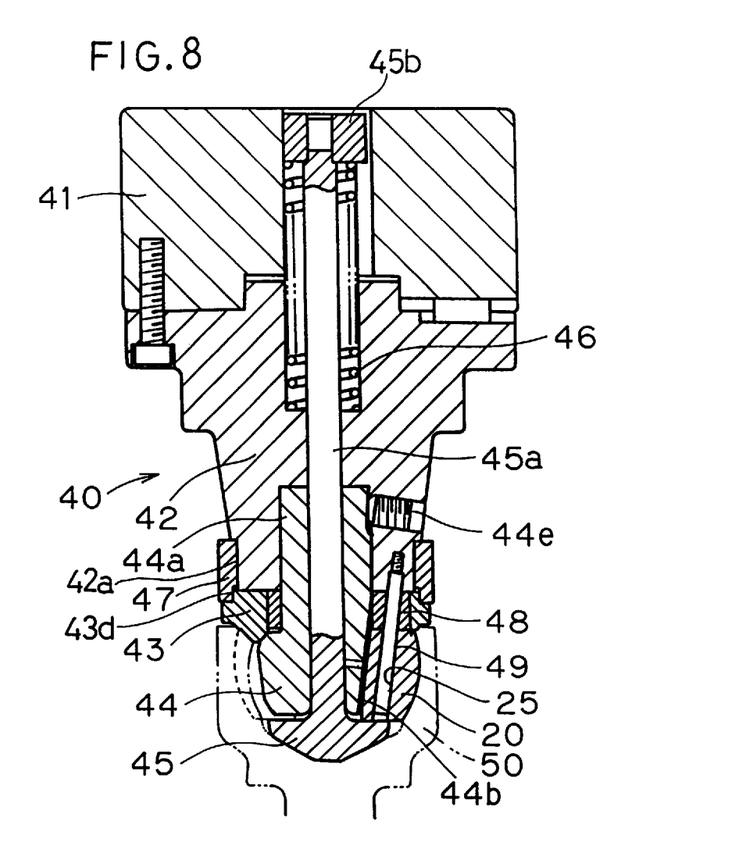
FIG. 8 is a cross-sectional view taken along the line VIII—VIII in FIG. 7.
Figure 9A:
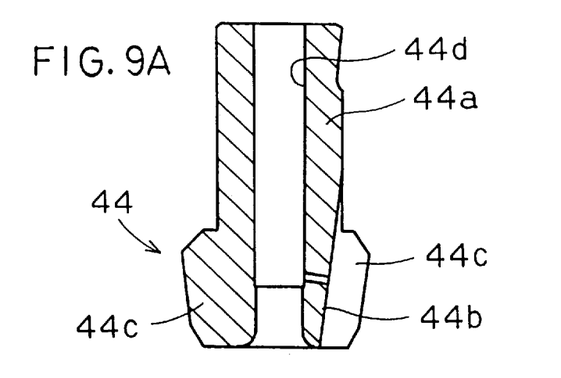
FIG. 9A is a sectional view of a base in the combination punch.
Figure 9B:
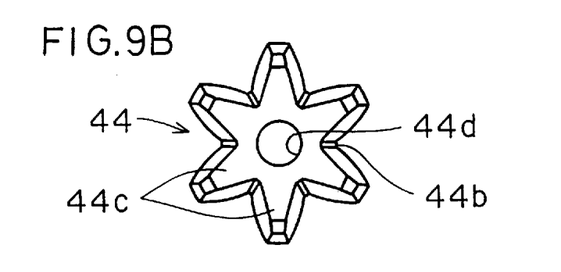
FIG. 9B is a bottom plan view of the base shown in FIG. 9A.

The taper base 44 is of a design in which, as shown in FIG. 9A, a lower end of the shank 44a having the center hole 44d defined therein is formed with a tapered tip portion 44b extending downwardly so as to converge downwardly and is also formed with a plurality of splitting partition pieces 44c that protrude radially outwardly therefrom as shown in FIG. 9B. Each of the splitting partition pieces 44c has a cross-sectional shape tapering radially outwardly so as to represent a trapezoidal shape or a triangular shape, and has a side face so shaped as to converge towards the tip of the taper base 44 while being narrowed in width. Respective spaces each defined between the neighboring splitting partition pieces 44c are adapted to accommodate therein the split punches 20 as shown in FIG. 8.

Figure 10A:
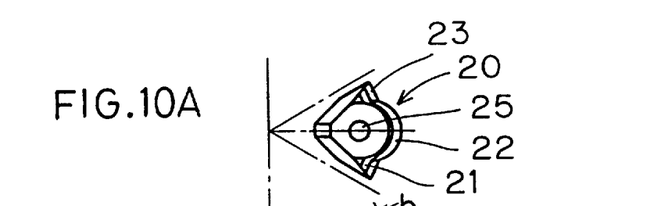
FIG. 10A is a plan view of split punches.
Figure 10B:
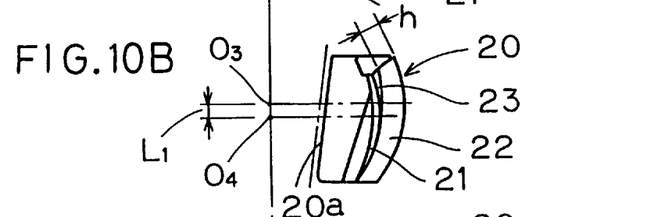
FIG. 10B is a side view of the split punches.
Figure 10C:
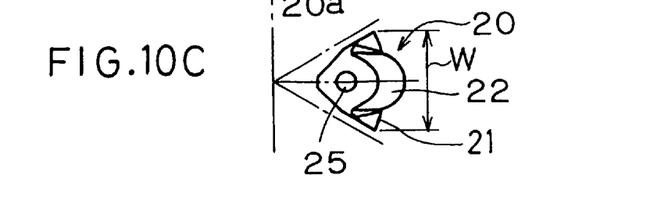
FIG. 10C is a bottom plan view of the split punches.

As shown in FIG. 10, each of the split punches 20 has a plane shape representing a generally sector-shape and includes a spherical surface shaping portion 21 corresponding to the arch of the sector shape assumed by the corresponding split punch 20, and a track groove shaping portion 22 of a curved shape formed on the spherical surface shaping portion 21. The spherical surface shaping portion 21 is of a design wherein, as shown in FIGS. 10A and 10C, the width W thereof increases progressively from its opposite ends towards a position intermediate of the height thereof. On the other hand, the track groove shaping portion 22 extends in a arcuate shape from an upper end thereof towards a lower end thereof.

The center of curvature $O_3$ of each of the track groove shaping portions 22 is offset a distance $L_1$ in a direction towards the upper end of the associated spherical surface shaping portion 21 relative to the center of sphere $O_4$ of such associated spherical surface shaping portion 21. This offset distance $L_1$ is equal to the amount of offset between the center of sphere $O_0$ of the outer race 1 and the center of curvature $O_1$ of each of the track grooves 3.

Each of the track groove shaping portion 22 has its opposite side formed with arcuately bulged portions 23 that extend from the upper end thereof towards a point intermediate of the length thereof. The radial position of the arcuately bulged portions 23 lie between the spherical surface shaping portion 21 and the track groove shaping portion 22 while the axial position thereof lies on an upper side or a deeper side of the position intermediate of the length thereof adjacent the upper end thereof.

The spherical surface shaping portion 21 is surface-finished by milling and, similarly, the track groove shaping portion 22 is polished by milling except for the arcuately bulged portion 23. A portion of the track groove shaping portion 22 provided with the bulged portions on respective sides thereof has a constant effective track shaping height h over the entire length thereof.

Each of the split punches 20 is of a design in which a ridge 20a on one side adjacent the center of the sector shape is inclined along the corresponding tapered tip portion 44b of the taper base 44 as shown in FIG. 9A, and has a guide hole 25 bored therein, as shown in FIG. 10A, so as to extend along the inclination of the ridge 20a. Each of those split punches 20 is disposed to the lower end surface of the holder 42 through a ring-shaped spacer 48 as shown in FIG. 8 and is supported for movement up and down along the tapered tip portion 44b of the taper base 44 by means of a corresponding guide pin 49 which is passed through the guide hole 25 and a through-hole in the spacer 48 and is then screwed into a corresponding screw hole in the holder 42.

The downward movement of each of the split punches 20 is constrained by the front punch 45. In other words, the front punch 45 is upwardly biased by a spring 46 which is mounted externally on an upper portion of the shaft 45a and which applies an upwardly acting biasing force to a cap 45b fixedly mounted on an upper end of the shaft 45a, so that a lower end surface of the respective split punch 20 is held in abutment with an outwardly flared portion at the lower end of the front punch 45.

Figure 11A:
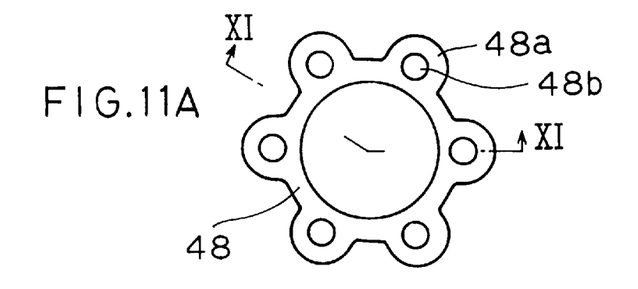
FIG. 11A is a bottom plan view of a spacer in the combination punch.
Figure 11B:
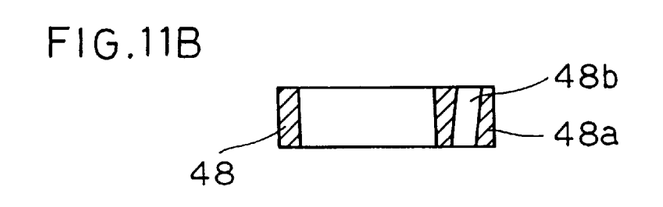
FIG. 11B is a cross-sectional view taken along the line XI—XI in FIG. 11A.

As shown in FIG. 11A, the ring-shaped spacer 48 is of a ring-shape, having its outer peripheral surface formed with a plurality of arcuate projections 48a, and each of those arcuate projections 48a has a hole 48b defined therein for passage of a corresponding guide pin 49 as shown in FIG. 11B.

Figure 4:
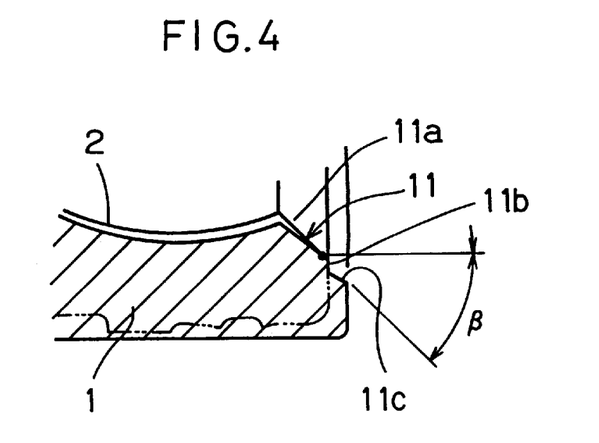
FIG. 4 is a sectional view showing, on an enlarged scale, a portion indicated by IV in FIG. 3.
Figure 12A:
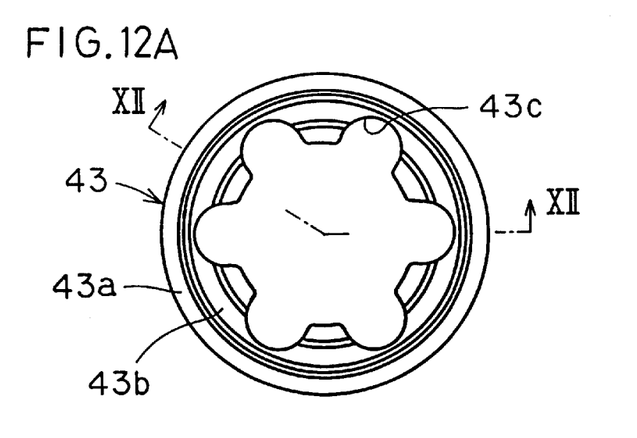
FIG. 12A is a bottom plan view of the split punches.
Figure 12B:
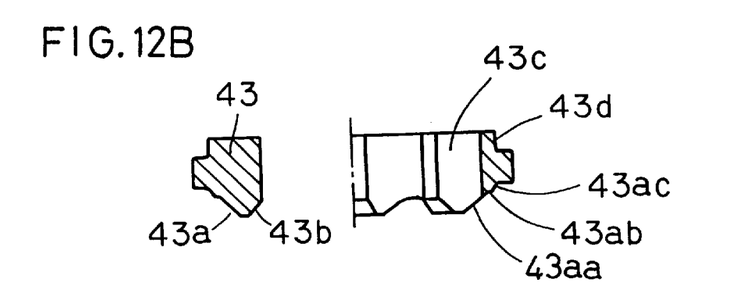
FIG. 12B is a cross-sectional view taken along the line XII—XII in FIG. 12A.

As shown in FIG. 12A, the chamfer forming die 43 is of a ring-shape having an outer peripheral portion of the lower surface formed into a chamfer forming surface 43a and also having an inner peripheral portion of the lower surface thereof formed into a split punch engaging surface 43b that is radially inwardly recessed. The chamfer forming surface 43a is of a shape having respective forming surface portions corresponding in position to the chamfer inner diametric portion 11a, the flat portion 11b and the chamfer outer diametric portion 11c of the entry chamfer 11 in the outer race 1 as shown in FIG. 4. Accordingly, the chamfer forming surface 43a is defined as shown in FIG. 12B by a tapering surface portion 43aa, a flat portion 43ab continued radially outwardly from the tapering surface portion 43aa, and a tapering surface portion 43ac continued radially outwardly from the flat portion 43ab. As shown in FIG. 12A, the inner diametric surface of the chamfer forming die 43 is so shaped as to be suited for engagement with the spacer 48, shown in FIG. 11A, and is thus formed with arcuate recesses 43c for receiving therein the associated arcuate projections 48a formed in the spacer 48.

As shown in FIG. 12B, the chamfer forming die 43 has a circumferentially extending recess 43d formed at a top of the outer periphery thereof and is positioned relative to the holder 42 by means of a guide ring 47 that is engaged in part in the circumferentially extending recess 43d and in part in a circumferentially extending recess 42a formed on an outer peripheral surface of the lower end of the holder as shown in FIG. 8.

As shown in FIG. 13, the drawing punch 30 is formed with a shaping recess 31 having an inner wall surface so shaped as to correspond to the radially outer surface and the bottom end surface of the outer race 1, which recess 31 is opening upwardly to define an upper open end which is formed as an outwardly flared face 31a flaring outwardly in a direction away from the upper open end thereof. The shaping recess 31 has a bottom center portion formed with a bore 32 adapted to receive therein a shaft portion of the outer race 1.

Figure 16:
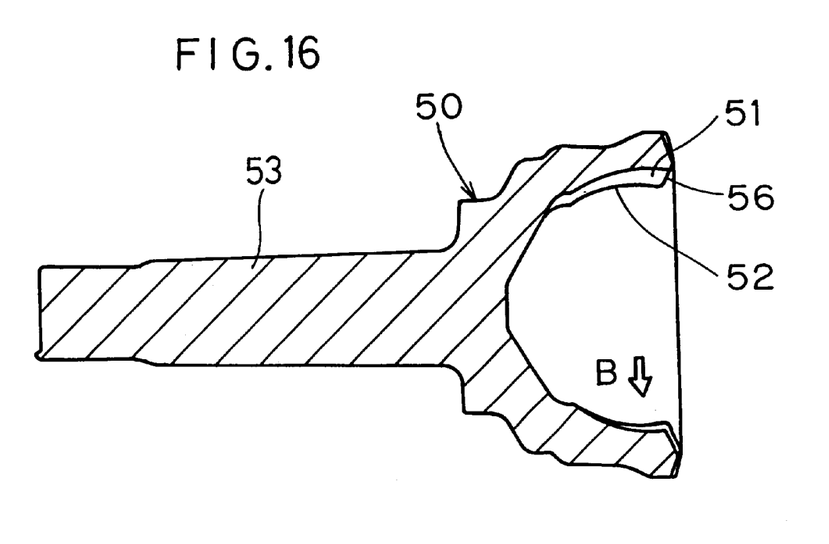
FIG. 16 is a longitudinal sectional view of the outer race material.
Figures 17A, 17B:
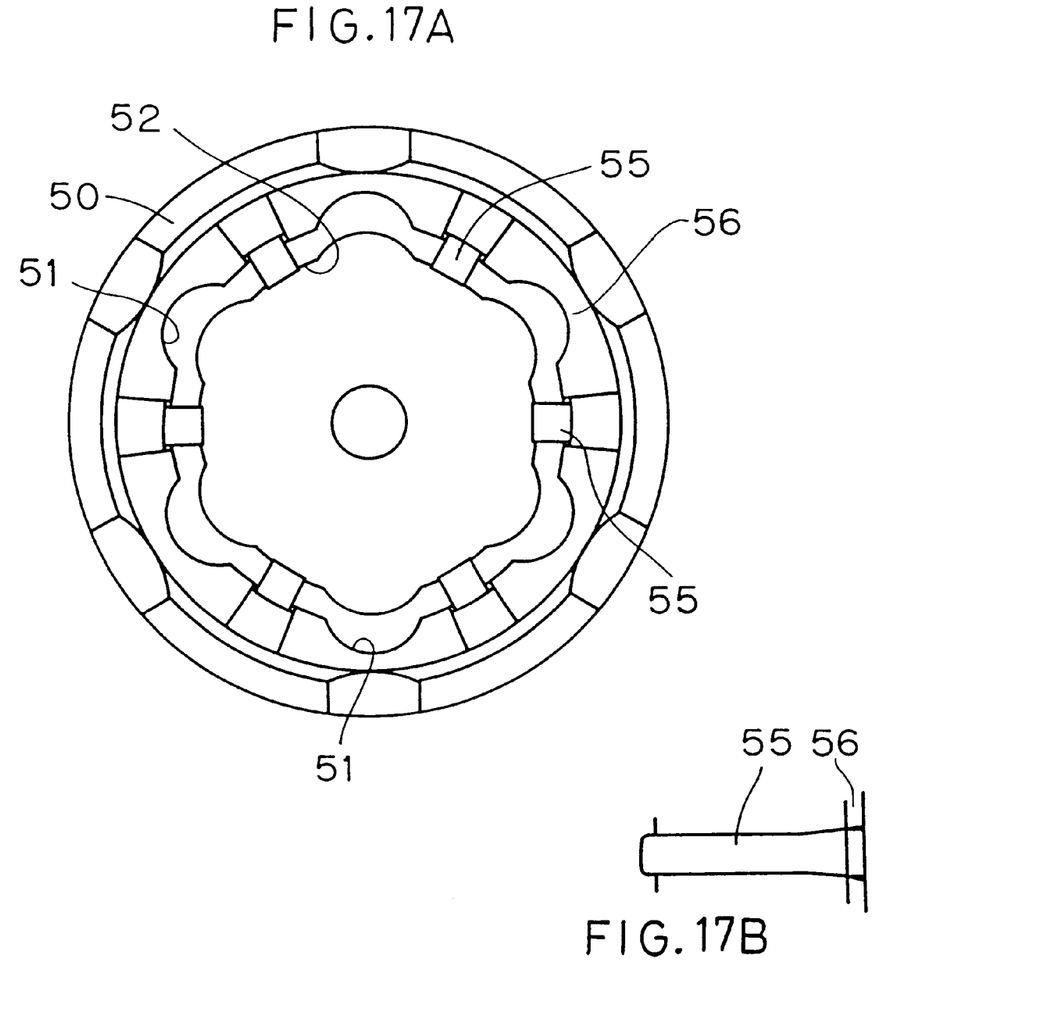
FIG. 17A is a front elevational view, on an enlarged scale, showing the outer race material as viewed from an entry.
FIG. 17B is a perspective view of a portion of FIG. 17A.

Hereinafter, a molding method utilizing the combination punch 40 and the drawing die 30 will be described. An outer race material 50 is, as shown in FIGS. 16 and 17, shaped in the form of a cup-like configuration by means of the plastic working process with a peripheral wall portion adjacent the opening thereof flared outwardly and with an inner periphery formed with track grooves 51 equal in number to the number of the split punches 20. A shaft 53 protrudes outwardly from a center of a bottom outer surface of the outer race material 50. Also, an open end face of the cup-shaped outer race material 50 is formed with an entry chamfer 56 that is correspondingly shaped.

Figure 14:
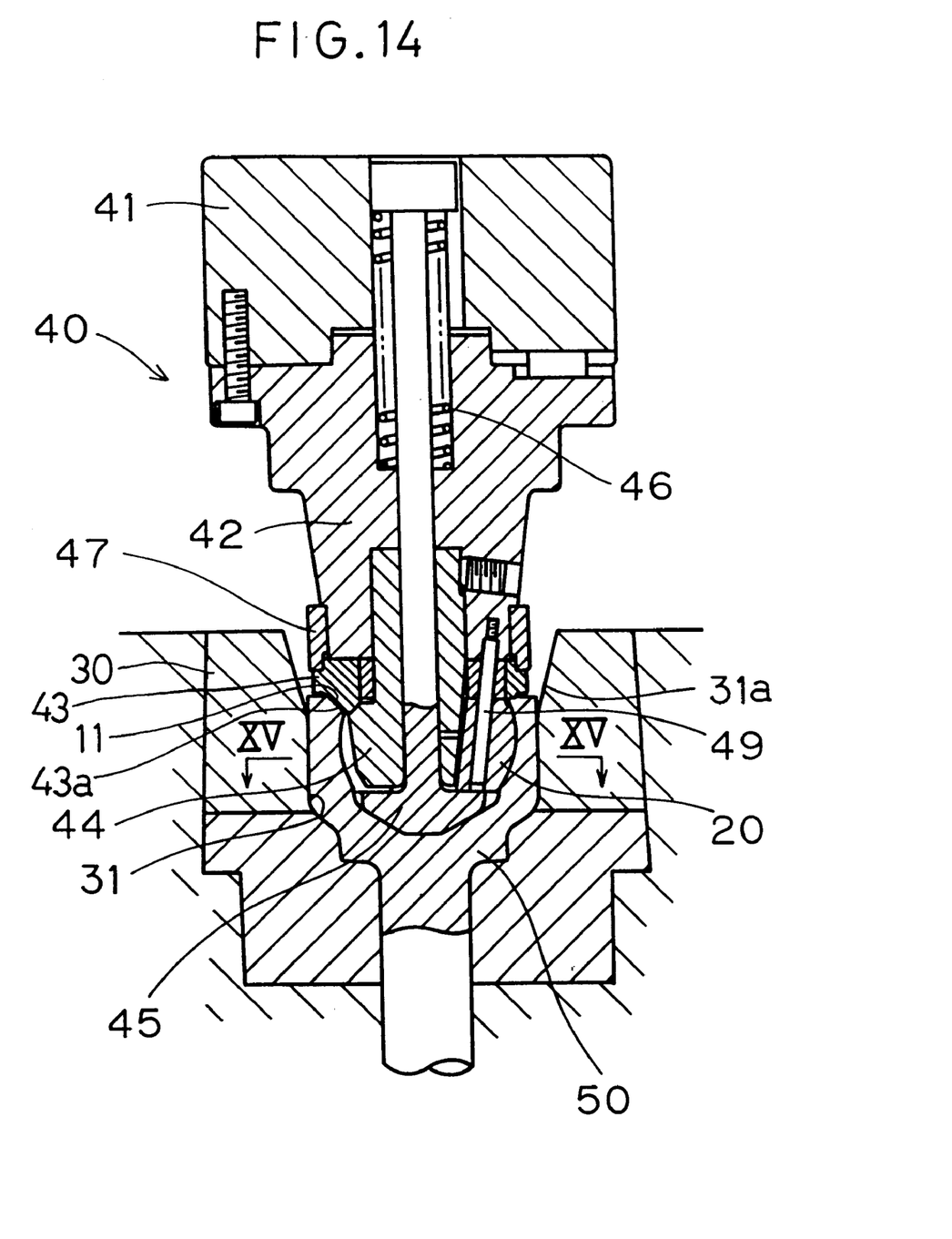
FIG. 14 is a longitudinal sectional view of the outer race forming die during formation of the outer race.
Figure 15:
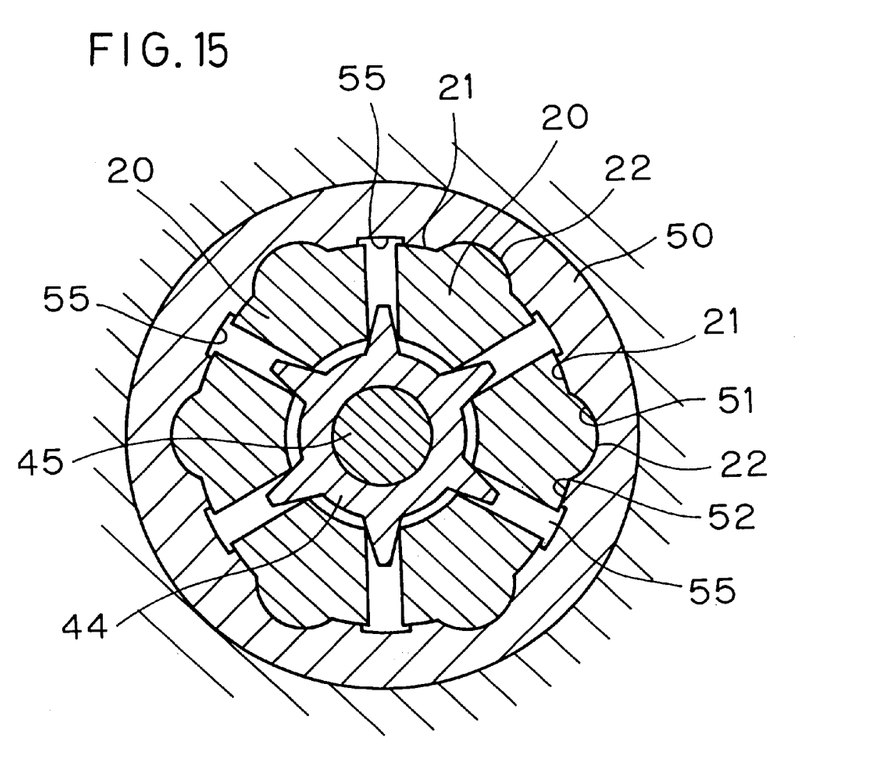
FIG. 15 is a cross-sectional view taken along the line XV—XV in FIG. 14.

After the cup-shaped outer race material 50 has been inserted inside the drawing die 30 shown in FIG. 13 and a press slide 41 has been subsequently lowered, the front punch 45 is brought into abutment with a spherical bottom of the outer race material 50 with the split punches 20 engaged in the respective track grooves 51. When in this condition the press slide 41 is further lowered, the outer race material 50 is drawn by the drawing die 30 with its outer diameter consequently reduced radially inwardly as shown in FIGS. 14 and 15. During this drawing operation, respective surfaces of the track grooves 51 shown in FIG. 15 are constrained by the track groove shaping portions 22 of the split punches 20 and the track grooves 51 and the spherical inner surface 52 are therefore plastically formed by the track groove shaping portions 22 and the spherical surface shaping portion 21, respectively, to a predetermined shape and a predetermined size.

Also, during this drawing operation, incident to the lowering of the press slide 41 shown in FIG. 14, the open end face of the outer race material 50 is axially pressed by the chamfer forming die 43 of the combination punch 40 and, accordingly, the open end face of the outer race material 50 is plastically formed to a final shape of the entry chamfer 11 of the outer race 1 that is defined by the chamfer forming surface 43a of the chamfer forming die 43. In such case, the entry chamfer 11 is such that the entry chamfer 56 (FIG. 16) formed in the outer race material 50 is shaped to the final shape by the chamfer forming die 43. It is, however, to be noted that the entry chamfer 56 need not be pre-formed in the outer race material 50, but the entry chamfer 11 may be formed directly during a shaping process by the combination punch 40.

It is also to be noted that the plastic working of the outer race material 50 may be carried out by means of a cold process, a hot process or a heated process.

After the shaping of the outer race material 50, the press slide 41 is lifted. Lifting of the press slide 41 is accompanied by a corresponding upward movement of the taper base 44. At this time, the split punches 20 are slid a slight distance axially downwardly along the tapered tip portion 44b of the taper base 44 against a restoring force of the spring 46 used to bias the front punch 45 in a lifting direction and, consequently, the circle row of arrangement of the plural split punches 20 are radially inwardly contracted. In this way, the plural split punches 20 are separated from the corresponding track grooves 51 in the outer race material 50, and the split punches 20 and the front punch 40 are drawn outwardly from the shaped outer race 1.

Thus, the spherical inner surface 2, the track grooves 3 and the entry chamfer 11 of the outer race 1 are simultaneously defined by the plastic working process. Since the plastic working process is employed as described above, securement of the precision of the combination punch 40 makes it possible to provide the spherical inner surface 2, the track grooves 3 and the entry chamfer 11 all having a highly accurate surface precision. For this reason, no after-grinding process is needed to grind the spherical inner surface 2, the track grooves 3 and the entry chamfer 11 and, consequently, the number of process steps to form the outer race 1 can advantageously be reduced, accompanied by a considerable reduction in cost of manufacture. Also, since the various surfaces are finished by the use of the plastic working process, it is also advantageous in terms of fibers in an internal structure of a steel material forming the outer race 1.

Since each of the track groove shaping portions 22 of each split punch 20 shown in FIG. 10 has the arcuately bulged portion 23 protruding from each of the opposite side faces thereof, the escapement 10 can be formed on the respective side face of each of the track grooves 3 in the formed outer race 1 as shown in FIGS. 2A and 2B. The escapement 10 is recessed radially outwardly from the spherical inner surface 2 to a depth smaller than the depth of the associated track groove 3. This escapement 10 is utilized to serve as a grease reservoir during assemblage of the constant velocity joint and, therefore, the track grooves 3 which are ball rolling surfaces can be effectively lubricated by grease contained in the escapements 10.

Figure 6A:
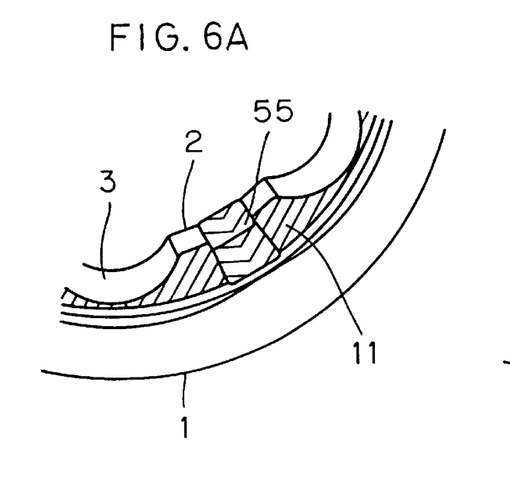
FIG. 6A is a fragmentary enlarged view of a front portion (indicated by VI) of the outer race material having been completed by the use of the plastic working process.
Figure 6B:
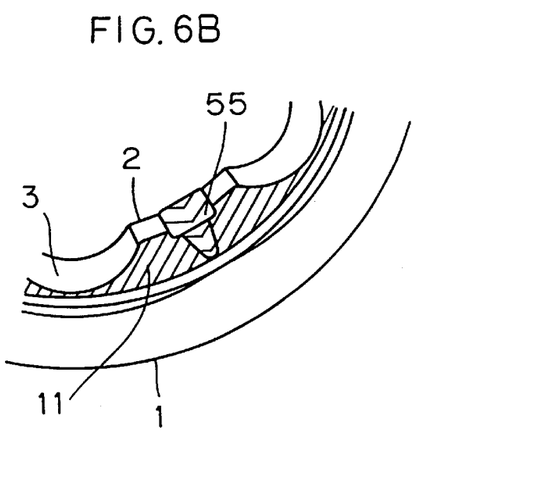
FIG. 6B is a fragmentary enlarged view of the front portion (indicated by VI) of a modified form of the outer race material having been completed by the use of the plastic working process.
Figure 7:
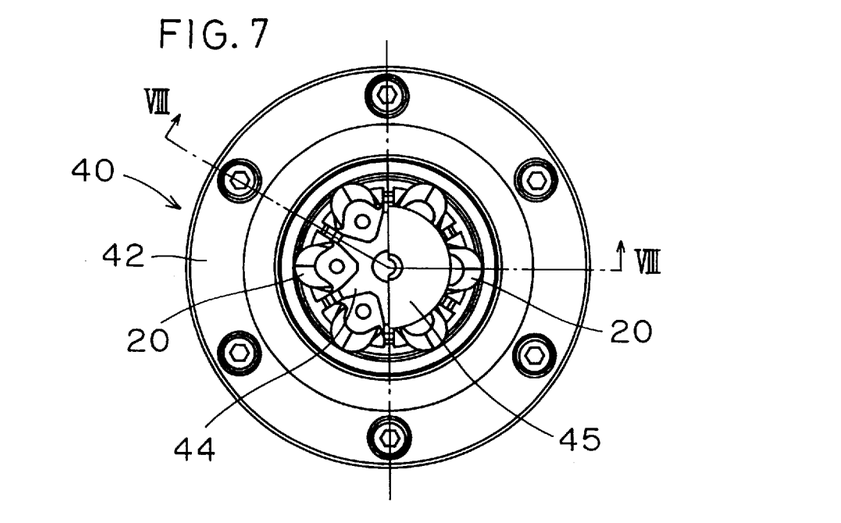
FIG. 7 is a bottom pan view of a combination punch.

As shown in FIG. 17A, a spherical inner surface 52 of the outer race material 50, (that is a portion of the outer race material 50 which is pressed against the spherical surface forming portion 21 of each of the split punches 20), and the entry chamfer are formed with an axially extending escapement groove 55. As a result, an extra filling which would be produced during the plastic working of the outer race material 50 will intrude into the escapement groove 55. For this reason, it is possible to avoid any possible formation of a raised portion in the spherical inner surface 52 of the outer race 1 which would protrude centrally axially. Accordingly, no grinding is needed to finish the spherical inner surface 52. It is to be noted that although the escapement grooves 55 may remain as shown by hatched areas in FIG. 6A or FIG. 6B at the time of completion of the plastic working, the presence of the escapement grooves 55 does not adversely affect the function of the constant velocity joint. FIGS. 6A and 6B illustrate respective shapes obtained after the completion of the plastic working in correspondence with various shapes of the escapement grooves 55 formed in the outer race material 50.

It is to be noted that although in the foregoing embodiment of the present invention the inner and outer spherical surfaces 9a and 9b of the cage 8 have been shown as coaxial with each other, the present invention can be equally applicable to the constant velocity joint of a type in which respective centers of the inner and outer spherical surfaces 9a and 9b of the cage 8 are axially offset relative to each other while respective centers of the track grooves 3 and 6 in the outer and inner races 1 and 4 are not offset relative to each other.

Also, the constant velocity joint embodying the present invention may be of a type in which the inner and outer races 1 and 4 are permitted to telescopically move in the axial direction relative to each other. In such case, the inner surface of the outer race 1 has to take such a shape that the spherical inner surface 2 is formed by a semi-spherical portion of the bottom side of the outer race 1 with a cylindrical inner surface extending from this semi-spherical portion towards the open end of the outer race 1, that is, a shape corresponding to a combination of a spherical surface and a cylindrical surface. In addition, the track grooves of the outer race 1 may be of a shape corresponding to a combination of a curved line and a straight line, in which the bottom side of the outer race 1 represents an arcuately curved line whereas the open end side thereof represents a straight line.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to he construed as included therein.

What is claimed is:

1. A constant velocity joint which comprises:
    an outer race having a spherical inner surface formed with track grooves each extending in an axial direction thereof;
    an inner race having a spherical outer surface formed with track grooves equal in number to the number of the track grooves in the outer race;
    a plurality of torque transmitting balls sandwiched between the inner race and the outer race and accommodated in part in the track grooves in the inner race and in part in the track grooves in the outer race;
    a cage for retaining the torque transmitting balls while being guided by and between the spherical inner surface of the outer face and the spherical outer surface of the inner race; and
    an axially extending escapement groove formed in the spherical inner surface and the entry chamfer of the outer race, and wherein at least the track grooves in the outer race and an entry chamfer of the outer race are formed by a plastic working process.

2. The constant velocity joint as claimed in claim 1, wherein the spherical inner surface of the outer race is formed by the plastic working process.

3. The constant velocity joint as claimed in claim 1, wherein each of the track grooves in the outer race has sides defined in a deep region thereof, each of the sides being formed with an escapement which is recessed radially outwardly from the spherical inner surface.

* * * * *